(12) United States Patent  (10) Patent No.: US 9,272,595 B2
Hayes et al.  (45) Date of Patent: Mar. 1, 2016

(54) CONTROLLING A COMPRESSOR FOR AIR SUSPENSION OF ELECTRIC VEHICLE

(71) Applicant: Tesla Motors, Inc., Palo Alto, CA (US)

(72) Inventors: Bradley W. Hayes, Santa Cruz, CA (US); Daniel Joseph Marioni, Sonoma, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 28 days.

(21) Appl. No.: 14/255,808

(22) Filed: Apr. 17, 2014

(65) Prior Publication Data
US 2015/0298520 A1  Oct. 22, 2015

(51) Int. Cl.
B60G 17/018 (2006.01)
B60G 17/015 (2006.01)
F04B 49/06 (2006.01)
B60G 17/019 (2006.01)

(52) U.S. Cl.
CPC .......... *B60G 17/0155* (2013.01); *B60G 17/019* (2013.01); *F04B 49/06* (2013.01); *B60G 2500/201* (2013.01); *B60G 2500/205* (2013.01); *B60G 2600/73* (2013.01)

(58) Field of Classification Search
CPC .... B60G 17/015; B60G 17/018; B60W 10/20
USPC .................... 701/37, 22; 280/5.514
See application file for complete search history.

(56) References Cited

U.S. PATENT DOCUMENTS

| | | |
|---|---|---|
| 5,452,919 A | 9/1995 | Hoyle et al. |
| 5,484,162 A | 1/1996 | Kanoh et al. |
| 8,219,262 B2 | 7/2012 | Stiller |
| 8,371,405 B2 * | 2/2013 | Ortmann et al. ............. 180/65.1 |
| 8,989,963 B1 * | 3/2015 | Yellambalase et al. ......... 701/37 |
| 2003/0230443 A1 * | 12/2003 | Cramer et al. ............... 180/65.5 |
| 2007/0040344 A1 | 2/2007 | Stiller et al. |
| 2009/0082921 A1 | 3/2009 | Rehra et al. |
| 2009/0254246 A1 | 10/2009 | Yang et al. |
| 2010/0250065 A1 | 9/2010 | Kelly et al. |
| 2012/0000722 A1 | 1/2012 | Pintos Pintos |
| 2012/0153718 A1 | 6/2012 | Rawlinson et al. |
| 2012/0325327 A1 | 12/2012 | Eggebrecht et al. |
| 2013/0000295 A1 | 1/2013 | Bissontz |
| 2013/0042932 A1 | 2/2013 | Bodet et al. |
| 2013/0062541 A1 | 3/2013 | Diekmeyer et al. |
| 2013/0124040 A1 | 5/2013 | Engelhardt |
| 2013/0133768 A1 | 5/2013 | Feyerabend et al. |
| 2013/0333969 A1 | 12/2013 | Dieckmann et al. |
| 2014/0034009 A1 | 2/2014 | Brinkmann et al. |
| 2014/0095023 A1 | 4/2014 | Myggen et al. |

FOREIGN PATENT DOCUMENTS

| | | |
|---|---|---|
| WO | WO 2004/024475 A1 | 3/2004 |
| WO | WO 2004/024477 A1 | 3/2004 |

* cited by examiner

*Primary Examiner* — Luke Huynh
(74) *Attorney, Agent, or Firm* — J. Richard Soderberg

(57) ABSTRACT

A method of controlling a compressor for an air suspension of an electric vehicle includes: determining a state of a reservoir in the electric vehicle, the reservoir coupled to drive air springs of a suspension system; determining whether the electric vehicle is connected to an external source of electric energy for charging an energy storage of the electric vehicle; in response to determining that the electric vehicle is connected to the external source, applying a first value as a threshold for whether to replenish the reservoir by a compressor; and in response to determining that the electric vehicle is not connected to the external source, applying a second value, different from the first value, as the threshold for whether to replenish the reservoir by the compressor.

37 Claims, 3 Drawing Sheets

CONTROLLING A COMPRESSOR FOR AIR SUSPENSION OF ELECTRIC VEHICLE

BACKGROUND

Some vehicles have air suspension systems that are coupled to a reservoir of pressurized air. To raise the vehicle, air from the compressor is fed into one or more air springs of the suspension by way of valves. To lower the vehicle, air is pulled from, or otherwise allowed to escape, the air spring(s).

Some such systems are referred to as open systems, because in them air removed from the air spring is not fed back into the reservoir but rather escapes into the atmosphere. By contrast, a closed suspension system is one in which air from the spring that is being lowered is directed back into the reservoir, typically by running the compressor. That is, compressors in closed systems are operated both when raising and lowering the springs, and therefore typically run more often than compressors in open systems. Nevertheless, closed systems are usually considered more efficient than open systems, because the compressor in the closed system is working against a smaller pressure differential than the one in the open system.

However, running the compressor does generate some noise that can be noticeable, particularly in an electric vehicle where the powertrain noise and vibration are significantly lower than in a vehicle with a traditional combustion engine. Also, the compressor in an electric vehicle is typically powered by the vehicle's internal energy storage (e.g., a battery pack), so that significant compressor use can affect the range of the vehicle between charging sessions.

SUMMARY

In a first aspect, a method of controlling a compressor for an air suspension of an electric vehicle includes: determining a state of a reservoir in the electric vehicle, the reservoir coupled to drive air springs of a suspension system; determining whether the electric vehicle is connected to an external source of electric energy for charging an energy storage of the electric vehicle; in response to determining that the electric vehicle is connected to the external source, applying a first value as a threshold for whether to replenish the reservoir by a compressor; and in response to determining that the electric vehicle is not connected to the external source, applying a second value, different from the first value, as the threshold for whether to replenish the reservoir by the compressor.

Implementations can include any or all of the following features. Applying the first value as the threshold corresponds to making the threshold less stringent than when the second value is applied as the threshold. Applying the first and second values as the threshold comprises comparing the first or second value with the determined state of the reservoir. Determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value. The method further includes, in response to determining that the electric vehicle is connected to the external source, powering the compressor by the external source. The external source is charging the energy storage, and the compressor is powered by the external source via the energy storage. The method further includes, in response to determining that the electric vehicle is not connected to the external source, powering the compressor by the energy storage. The method further includes: in response to determining that the electric vehicle is connected to the external source, determining whether a predefined amount of time has passed, wherein the first value is applied as the threshold after the predefined amount of time. The method further includes receiving a mode-setting input for the electric vehicle, wherein at least the second value is selected based on the mode-setting input. The method further includes: receiving a compressor-use standard for the electric vehicle, the compressor-use standard corresponding to a certain use of the suspension system; determining whether a current use of the electric vehicle conforms to the compressor-use standard; and in response to determining that the current use of the electric vehicle does not conforms to the compressor-use standard, presenting a message to a driver of the electric vehicle regarding the current use of the electric vehicle.

In a second aspect, an electric vehicle includes: a suspension system; a reservoir coupled to drive air springs of the suspension system; an energy storage; a connector configured for connecting the electric vehicle to an external source of electric energy for charging the energy storage; a compressor; and a controller for the compressor, the controller configured to (i) apply a first value as a threshold for whether to replenish the reservoir by the compressor when the connector connects the electric vehicle to the external source, and (ii) apply a second value, different from the first value, as the threshold for whether to replenish the reservoir by the compressor when the connector does not connect the electric vehicle to the external source.

Implementations can include any or all of the following features. The air springs have respective valves, each valve regulating air flow to and from the respective air spring. The electric vehicle further includes at least one sensor, wherein the controller is further configured to control operation of the valves based on the sensor

DETAILED DESCRIPTION

This document describes examples of systems and techniques for controlling a compressor for an air suspension of an electric vehicle. These control techniques can be implemented toward a goal of preferably running the compressor mostly during the times when the vehicle is being charged, and less preferably running the compressor while the vehicle is being driven. For example, this can reduce the extent to which the driver of the vehicle can hear or otherwise sense the compressor operating, because many drivers tend to leave their vehicle while charging. As another example, this also allows the compressor to be powered by the external grid, rather than by the energy stored in the vehicle's battery pack. As such, the vehicle's range can be improved.

Figure 1:
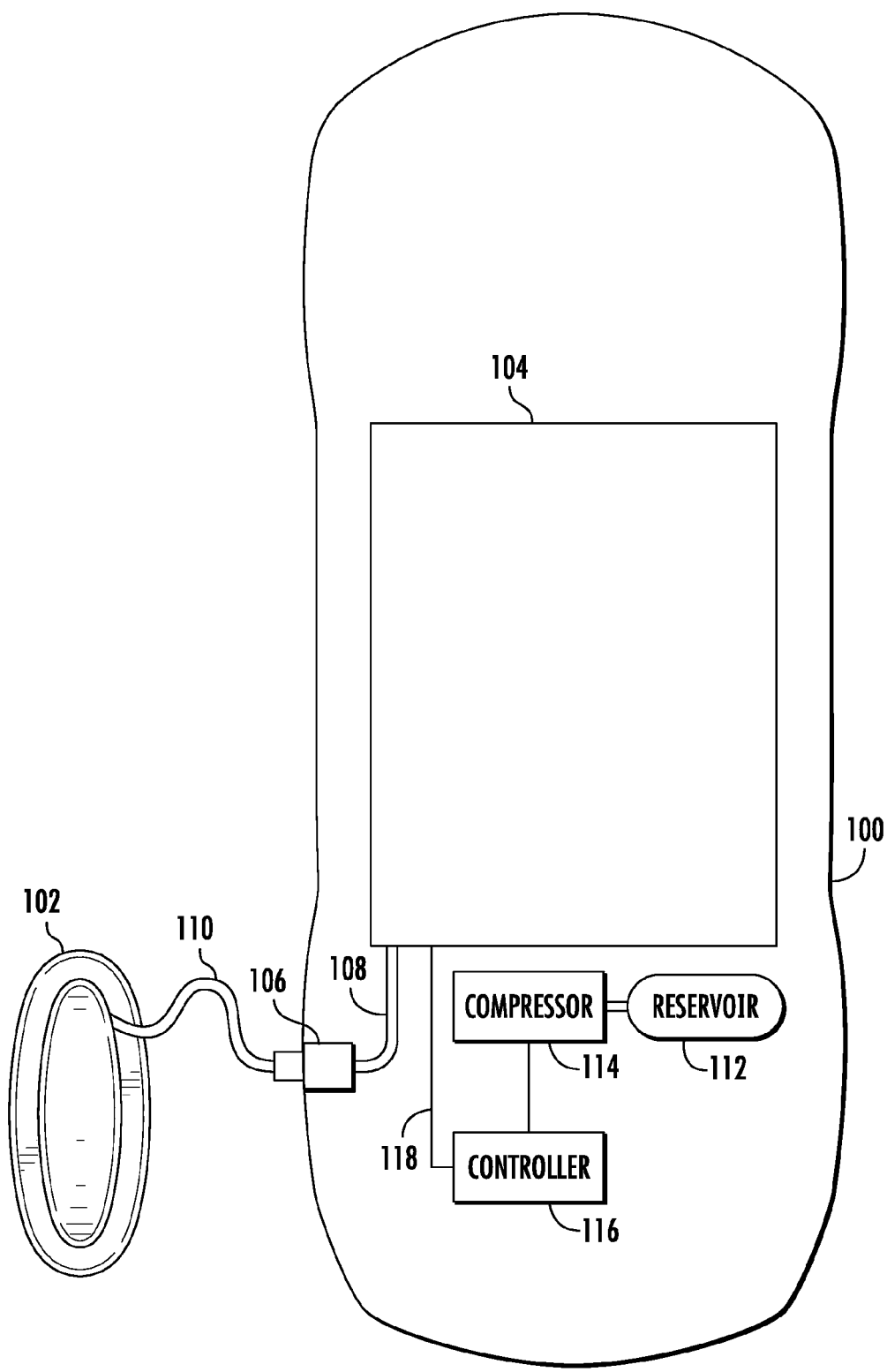
FIG. 1 schematically shows a vehicle connected to an external source of electric energy.

FIG. 1 schematically shows a vehicle 100 connected to an external source 102 of electric energy. The vehicle is here shown only in outline, from above, for illustration purposes. The vehicle is an electric vehicle, and therefore has energy storage 104 (e.g., a battery pack) that powers one or more drive units (not shown) for propulsion of the vehicle by way of at least one of the wheels. The energy storage can be charged from the external source and therefore has a connector 106 in the vehicle body (e.g., behind a port or other closure). The connector can have a form factor corresponding to one or more formats for charging connectors. One or more conduits 108 in the vehicle couple the connector to the energy storage. Thus, when a charging cable 110 from the external source is plugged into the connector, the energy storage can be charged with electric energy. Some vehicle components have been omitted here for simplicity, such as the electric motor(s), inverter(s), on-board charger(s) and/or other power electronics.

The suspension system of the vehicle 100 is based on air springs mounted to each of the vehicle's wheels. The vehicle therefore has a reservoir 112 coupled to the air springs, and a compressor 114 for providing compressed air to the reservoir. The reservoir is dimensioned according to the vehicle size, as well as to an estimated usage pattern for the vehicle, again with the goal to avoid or minimize the running of the compressor outside of charging sessions. That is, the reservoir should have enough capacity that when filled with a high enough pressure, it supports all the height changes than can be expected during a typical interval between charges (e.g., during one day). The reservoir can be made of any suitable material capable of holding pressurized air at the required pressures. For example, an aluminum material can be used.

For this and other reasons, the vehicle 100 has a controller 116 that controls when the compressor 114 should run (and optionally other vehicle functionality). The controller does so based on certain signals it receives from elsewhere in the vehicle, the signal(s) here being schematically represented by a signal connection 118 (e.g., one or more wires or other conduits from a signal source). As a particular example, the controller senses whether the vehicle is about to be charged (e.g., whether a charging session is underway, or at least whether the cable is plugged into the connector 106).

The detection that the vehicle is plugged in for charging causes the controller 116 to apply a less stringent threshold for determining when to start the compressor. For example, assume that the reservoir 112 is normally filled to a certain pressure—say, 20 bar—after which the compressor is turned off. Performing one or more raising operations consumes some amount of the pressurized air in the reservoir, and the reservoir pressure therefore decreases (e.g., below 20 bar) as the air suspension is used. When the reservoir pressure reaches a lower threshold, this will trigger the compressor to replenish the reservoir with pressurized air.

The replenishment threshold is different depending on whether the vehicle is currently in a charging session (e.g., is plugged into charging equipment) or is not in a charging session (e.g., the vehicle is currently being driven). For example, during the charging session the pressure threshold can be higher (e.g., 18 bar), whereas otherwise the threshold can be lower (e.g., 12 bar). That is, when the vehicle is not being charged, a greater pressure drop (compared to the full reservoir) is required for triggering a run of the compressor than during a charging session.

Use of the reservoir pressure as a signal to determine whether to replenish the reservoir is here mentioned as an example only. In other implementations, another metric can be used, including, but not limited to, the number of compressor operations that have been performed since the last reservoir replenishment.

Figure 2:
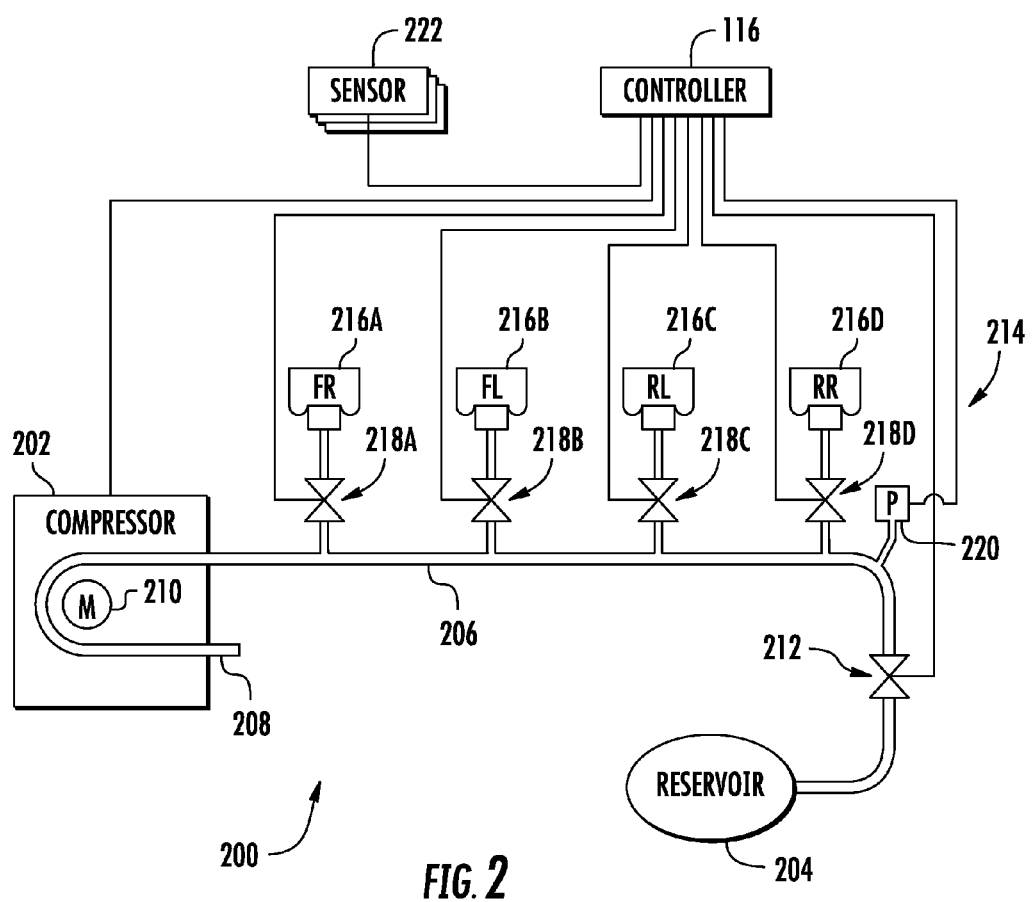
FIG. 2 shows an example of a system that controls a compressor for a reservoir.

FIG. 2 shows an example of a system 200 that controls a compressor 202 for a reservoir 204. The compressor and the reservoir are coupled by a line 206 (e.g., a tube or other conduit) for pressurized air. That is, the compressor can draw air from the ambient through at least one inlet 208, pressurize the air by way of one or more motors 210, and then feed the pressurized air toward the reservoir 204 through the line 206, as regulated by at least one valve 212.

Also connected to the line 206 is a suspension system 214 for the vehicle. The suspension system has air springs 216A-D for the respective front and rear, left and right, wheels of the vehicle (labeled FL, FR, RL and RR, respectively). Each of the air springs is coupled to the line 206 by way of a respective valve 218A-D. That is, each of the air springs can individually (or in combination with others) be activated by pressurized air, or have air released, through its respective valve.

The system 200 is an open system, so air that flows out of any of the air springs when lowering that spring will pass out to the ambient, in this example by way of the same inlet 208 where air is otherwise drawn into the compressor. A pressure sensor 220 is also connected to the line 206 so as to monitor the pressure of the air therein.

The controller 116 is connected to several components of the system 200 for controlling and determining the state of the compressor 202, the reservoir 204 and the individual valves 212 and 218A-D. The controller does so based on inputs received from one or more sensors 222, that for example indicate whether the vehicle is plugged in, whether the vehicle is moving, whether the driver has left the driver's seat and closed the door, to name just a few examples.

That is, the controller 116 here governs both the operation of the air springs (e.g., raising or lowering them) and the operation of the compressor (e.g., when to replenish the reservoir with pressurized air). For example, the system 200 can be implemented in the vehicle 100 (FIG. 1) to provide vehicle suspension that helps reduce or eliminate the use of the compressor outside of charging sessions for the electric vehicle.

Figure 3:
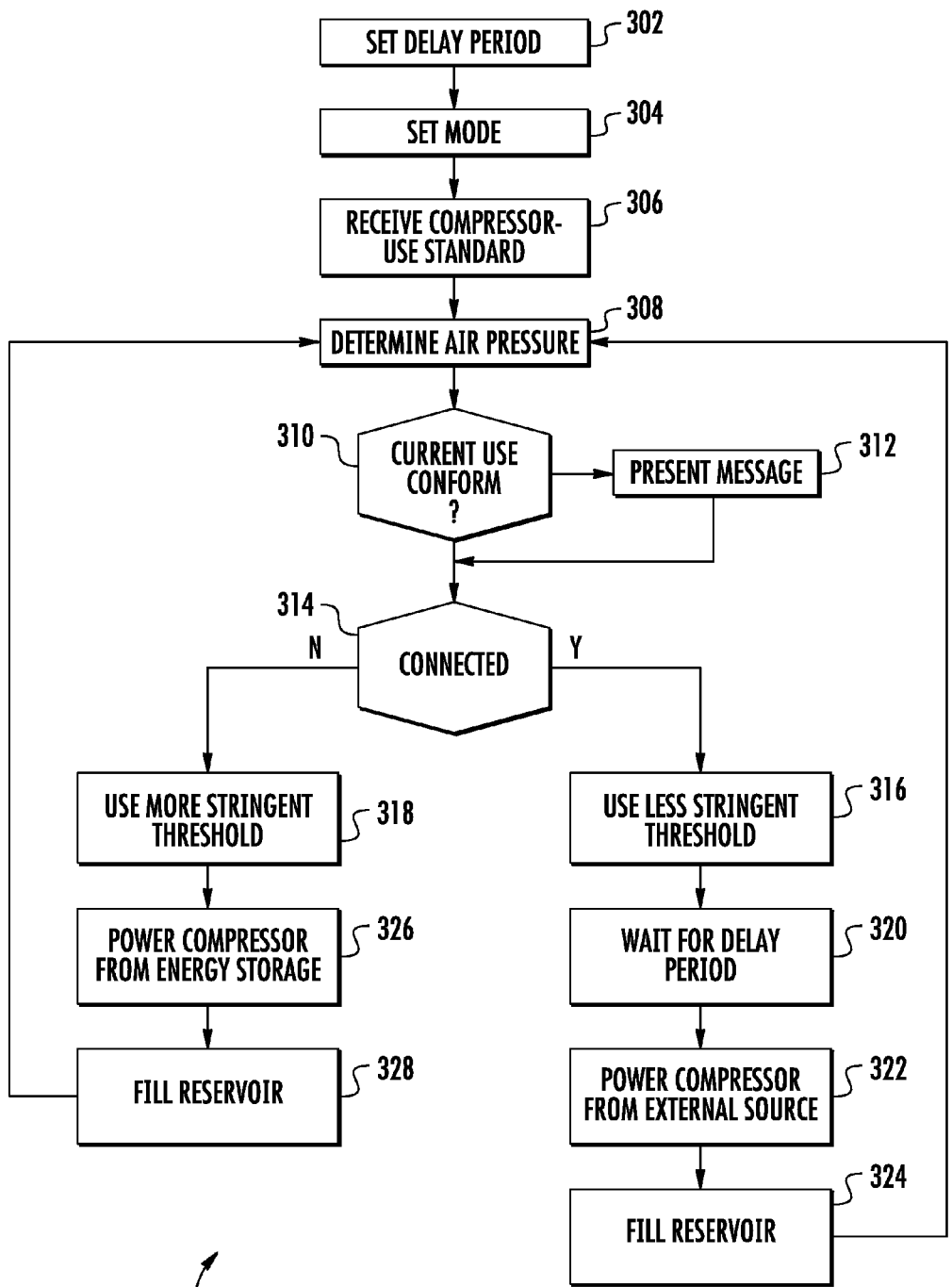
FIG. 3 shows an example of a method that controls a compressor for an air suspension of an electric vehicle.

FIG. 3 shows an example of a method 300 that controls a compressor for an air suspension of an electric vehicle. The method can be practiced in either or both of the vehicle 100 (FIG. 1) and the system 200 (FIG. 2), to name just two examples. In some implementations, the method can include more or fewer operations than shown, or one or more operations can be performed in a different order than in this example.

At 302, a delay period can be set. The delay period can regulate how soon after the beginning of a charging session that the compressor should typically start running. For example, the delay period can seek to ensure that the driver has left the vehicle (after initiating the charging session) when the compressor is turned on. The delay time can be set as a user option. For example, the user option can be entered via an interface in the vehicle, or by a handheld device in communication with the controller 116 in FIGS. 1-2.

At 304, a vehicle operation mode can be set. In some implementations, the vehicle can provide the driver different modes to choose from, and at least one of the modes can involve a regulation of how the vehicle suspension compressor will be operated, if at all, during driving. For example, the mode can specify that the compressor will run during charging unless the pressure is already above a certain value (e.g., 18 bar), and that the compressor will not run outside of charging unless the pressure falls below a certain value (e.g., 12 bar). These numerical values are examples only.

At 306, a compressor-use standard can be received. The compressor-use standard corresponds to a typically expected use of the air suspension over a predefined time (e.g., during one day). From time to time, the air suspension can be activated for any of multiple reasons, including, but not limited to: for aerodynamic performance reasons, to clear a steep incline or obstacle, to allow easier egress and ingress, to compensate for increased weight of the vehicle, and for driver preference. The compressor-use standard specifies, using a suitable metric, how much use of the air suspension is considered typical, in the sense of not going beyond the capacity of the air reservoir in the ordinary time between two charging sessions. For example, the compressor-use standard can comprise a relationship between the remaining pressure in the reservoir and the state of charge in the vehicle's battery pack.

At 308, the pressure available from the air reservoir can be determined. For example, the pressure sensor 220 (FIG. 2) can be used. In some implementations, this determined pressure can then be compared to a threshold to determine whether the reservoir should be replenished.

At 310, it can be determined whether the current use of the air suspension system conforms to the compressor-use standard. For example, the use conforms to the standard if the vehicle currently has at least a specified amount of pressure remaining in the reservoir given how soon the vehicle is likely to need a recharge. As another example, the use does not conform to the standard if the vehicle has used up more of the pressurized air than expected. In case of nonconformance with the standard, a message can be presented to the driver at 312. For example, the vehicle user interface can inform the driver that "Frequent Use of the Air Suspension Can Cause the Compressor to Turn On While You are Driving." As another example, if the compressor is actually operated during driving—e.g., because the reservoir pressure fell below a lower threshold—the vehicle can inform the driver that "The Compressor is Currently Running, Due to Frequent Use of the Air Suspension System."

At 314, it can be determined whether the vehicle is currently connected to an external source of electric power (e.g., the external source 102 in FIG. 1). If the answer is yes, then a relatively less stringent threshold for reservoir replenishment can be used, at 316. That is, the less stringent threshold can make it more likely that the compressor will be run during the charging session than otherwise. On the other hand, if the vehicle is not currently connected at 314, then a relatively more stringent threshold for reservoir replenishment can be used, at 318. The more stringent threshold can make it less likely that the compressor will be run outside of the charging session than otherwise.

Beginning with the former of these scenarios, a delay period can then be applied at 320. For example, this period can seek to ensure that even during a charging session, the compressor does not start running until after a certain period (e.g., until the driver typically has closed and left the vehicle).

At 322, it can be ensured that the compressor is powered by the external electricity source, rather than by stored energy in the vehicle's battery pack (or other energy storage). For example, while the battery pack is being charged by the external source, the compressor can consume a certain amount of the energy from the external source, thereby not affecting the vehicle's range.

At 324, the reservoir can then be filled (e.g., up to a predefined maximum level) while the charging session is ongoing. That is, application of the less stringent threshold (e.g., a higher pressure value), as determined at 316, has caused the compressor to start running when the vehicle is being charged, and the reservoir replenishment will continue until the controller turns off the compressor.

Turning now to the other scenario at 318 where the more stringent threshold is used, this occurs when the external power source is currently not connected to the vehicle (e.g., because the vehicle is currently being driven on the road). Accordingly, if the compressor nevertheless needs to be operated (e.g., because the reservoir has reached a low pressure level that meets the more stringent threshold), the compressor will be powered, at 326, by the vehicle's internal energy storage.

At 328, the thus powered compressor accordingly fills the reservoir to the predetermined level.

After replenishing the reservoir at 324 or 328, operations can return to 308 for determination of currently available pressure.

A number of implementations have been described as examples. Nevertheless, other implementations are covered by the following claims.

What is claimed is:

1. A method of controlling a compressor for an air suspension of an electric vehicle, the method comprising:
    determining a state of a reservoir in the electric vehicle, the reservoir coupled to drive air springs of a suspension system;
    determining whether the electric vehicle is connected to an external source of electric energy for charging an energy storage of the electric vehicle;
    in response to determining that the electric vehicle is connected to the external source, applying a first value as a threshold for whether to replenish the reservoir by a compressor; and
    in response to determining that the electric vehicle is not connected to the external source, applying a second value, different from the first value, as the threshold for whether to replenish the reservoir by the compressor, wherein applying the first value as the threshold corresponds to making the threshold less stringent than when the second value is applied as the threshold.

2. The method of claim 1, wherein applying the first and second values as the threshold comprises comparing the first or second value with the determined state of the reservoir.

3. The method of claim 2, wherein determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value.

4. The method of claim 1, further comprising, in response to determining that the electric vehicle is connected to the external source, powering the compressor by the external source.

5. The method of claim 4, wherein the external source is charging the energy storage, and wherein the compressor is powered by the external source via the energy storage.

6. The method of claim 1, further comprising, in response to determining that the electric vehicle is not connected to the external source, powering the compressor by the energy storage.

7. The method of claim 1, further comprising:
    in response to determining that the electric vehicle is connected to the external source, determining whether a predefined amount of time has passed, wherein the first value is applied as the threshold after the predefined amount of time.

8. The method of claim 1, further comprising receiving a mode-setting input for the electric vehicle, wherein at least the second value is selected based on the mode-setting input.

9. The method of claim 1, further comprising:
    receiving a compressor-use standard for the electric vehicle, the compressor-use standard corresponding to a certain use of the suspension system;

determining whether a current use of the electric vehicle conforms to the compressor-use standard; and in response to determining that the current use of the electric vehicle does not conform to the compressor-use standard, presenting a message to a driver of the electric vehicle regarding the current use of the electric vehicle.

10. The method of claim 9, wherein the compressor-use standard comprises a relationship between remaining pressure in the reservoir and a state of charge of the energy storage.

11. An electric vehicle comprising:
a suspension system;
a reservoir coupled to drive air springs of the suspension system;
an energy storage;
a connector configured for connecting the electric vehicle to an external source of electric energy for charging the energy storage;
a compressor; and
a controller for the compressor, the controller configured to (i) apply a first value as a threshold for whether to replenish the reservoir by the compressor when the connector connects the electric vehicle to the external source, and (ii) apply a second value, different from the first value, as the threshold for whether to replenish the reservoir by the compressor when the connector does not connect the electric vehicle to the external source, wherein the first value makes the threshold less stringent than does the second value.

12. The electric vehicle of claim 11, wherein the air springs have respective valves, each valve regulating air flow to and from the respective air spring.

13. The electric vehicle of claim 12, further comprising at least one sensor, wherein the controller is further configured to control operation of the valves based on the sensor.

14. A method of controlling a compressor for an air suspension of an electric vehicle, the method comprising:
determining a state of a reservoir in the electric vehicle, the reservoir coupled to drive air springs of a suspension system;
determining whether the electric vehicle is connected to an external source of electric energy for charging an energy storage of the electric vehicle;
in response to determining that the electric vehicle is connected to the external source, applying a first value as a threshold for whether to replenish the reservoir by a compressor; and
in response to determining that the electric vehicle is not connected to the external source, applying a second value, different from the first value, as the threshold for whether to replenish the reservoir by the compressor, wherein applying the first and second values as the threshold comprises comparing the first or second value with the determined state of the reservoir.

15. The method of claim 14, wherein determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value.

16. The method of claim 14, further comprising:
in response to determining that the electric vehicle is connected to the external source, determining whether a predefined amount of time has passed, wherein the first value is applied as the threshold after the predefined amount of time.

17. The method of claim 14, further comprising receiving a mode-setting input for the electric vehicle, wherein at least the second value is selected based on the mode-setting input.

18. The method of claim 14, further comprising:
receiving a compressor-use standard for the electric vehicle, the compressor-use standard corresponding to a certain use of the suspension system;
determining whether a current use of the electric vehicle conforms to the compressor-use standard; and
in response to determining that the current use of the electric vehicle does not conform to the compressor-use standard, presenting a message to a driver of the electric vehicle regarding the current use of the electric vehicle.

19. The method of claim 18, wherein the compressor-use standard comprises a relationship between remaining pressure in the reservoir and a state of charge of the energy storage.

20. A method of controlling a compressor for an air suspension of an electric vehicle, the method comprising:
determining a state of a reservoir in the electric vehicle, the reservoir coupled to drive air springs of a suspension system;
determining whether the electric vehicle is connected to an external source of electric energy for charging an energy storage of the electric vehicle;
in response to determining that the electric vehicle is connected to the external source, applying a first value as a threshold for whether to replenish the reservoir by a compressor, and powering the compressor by the external source; and
in response to determining that the electric vehicle is not connected to the external source, applying a second value, different from the first value, as the threshold for whether to replenish the reservoir by the compressor.

21. The method of claim 20, wherein the external source is charging the energy storage, and wherein the compressor is powered by the external source via the energy storage.

22. The method of claim 20, wherein applying the first and second values as the threshold comprises comparing the first or second value with the determined state of the reservoir.

23. The method of claim 22, wherein determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value.

24. The method of claim 20, further comprising:
in response to determining that the electric vehicle is connected to the external source, determining whether a predefined amount of time has passed, wherein the first value is applied as the threshold after the predefined amount of time.

25. The method of claim 20, further comprising receiving a mode-setting input for the electric vehicle, wherein at least the second value is selected based on the mode-setting input.

26. A method of controlling a compressor for an air suspension of an electric vehicle, the method comprising:
determining a state of a reservoir in the electric vehicle, the reservoir coupled to drive air springs of a suspension system;

determining whether the electric vehicle is connected to an external source of electric energy for charging an energy storage of the electric vehicle;

in response to determining that the electric vehicle is connected to the external source, determining whether a predefined amount of time has passed, and applying a first value as a threshold for whether to replenish the reservoir by a compressor after the predefined amount of time; and in response to determining that the electric vehicle is not connected to the external source, applying a second value, different from the first value, as the threshold for whether to replenish the reservoir by the compressor.

27. The method of claim 26, wherein determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value.

28. The method of claim 26, further comprising receiving a mode-setting input for the electric vehicle, wherein at least the second value is selected based on the mode-setting input.

29. The method of claim 26, further comprising:
receiving a compressor-use standard for the electric vehicle, the compressor-use standard corresponding to a certain use of the suspension system;
determining whether a current use of the electric vehicle conforms to the compressor-use standard; and
in response to determining that the current use of the electric vehicle does not conform to the compressor-use standard, presenting a message to a driver of the electric vehicle regarding the current use of the electric vehicle.

30. The method of claim 29, wherein the compressor-use standard comprises a relationship between remaining pressure in the reservoir and a state of charge of the energy storage.

31. A method of controlling a compressor for an air suspension of an electric vehicle, the method comprising:
receiving a mode-setting input for the electric vehicle;
determining a state of a reservoir in the electric vehicle, the reservoir coupled to drive air springs of a suspension system;
determining whether the electric vehicle is connected to an external source of electric energy for charging an energy storage of the electric vehicle;
in response to determining that the electric vehicle is connected to the external source, applying a first value as a threshold for whether to replenish the reservoir by a compressor; and
in response to determining that the electric vehicle is not connected to the external source, applying a second value, different from the first value, as the threshold for whether to replenish the reservoir by the compressor, wherein at least the second value is selected based on the mode-setting input.

32. The method of claim 31, wherein determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value.

33. The method of claim 31, further comprising:
in response to determining that the electric vehicle is connected to the external source, determining whether a predefined amount of time has passed, wherein the first value is applied as the threshold after the predefined amount of time.

34. The method of claim 31, further comprising:
receiving a compressor-use standard for the electric vehicle, the compressor-use standard corresponding to a certain use of the suspension system;
determining whether a current use of the electric vehicle conforms to the compressor-use standard; and
in response to determining that the current use of the electric vehicle does not conform to the compressor-use standard, presenting a message to a driver of the electric vehicle regarding the current use of the electric vehicle.

35. The method of claim 34, wherein the compressor-use standard comprises a relationship between remaining pressure in the reservoir and a state of charge of the energy storage.

36. A method of controlling a compressor for an air suspension of an electric vehicle, the method comprising:
receiving a compressor-use standard for the electric vehicle, the compressor-use standard corresponding to a certain use of a suspension system;
determining a state of a reservoir in the electric vehicle, the reservoir coupled to drive air springs of the suspension system;
determining whether the electric vehicle is connected to an external source of electric energy for charging an energy storage of the electric vehicle;
in response to determining that the electric vehicle is connected to the external source, applying a first value as a threshold for whether to replenish the reservoir by a compressor;
in response to determining that the electric vehicle is not connected to the external source, applying a second value, different from the first value, as the threshold for whether to replenish the reservoir by the compressor;
determining whether a current use of the electric vehicle conforms to the compressor-use standard; and
in response to determining that the current use of the electric vehicle does not conform to the compressor-use standard, presenting a message to a driver of the electric vehicle regarding the current use of the electric vehicle.

37. The method of claim 36, wherein determining the state of the reservoir comprises determining a pressure of air in the reservoir, wherein the first and second values are respective first and second pressure values, and wherein applying the first and second pressure values as the threshold comprises replenishing the reservoir by the compressor if the determined pressure is at or below the first or second pressure value.

* * * * *